US007563093B2

United States Patent
Clarke

(10) Patent No.: US 7,563,093 B2
(45) Date of Patent: Jul. 21, 2009

(54) INJECTION COMPRESSION MOULDING APPARATUS

(75) Inventor: Peter Clarke, Petworth (GB)

(73) Assignee: Im-Pak Technologies Limited, Chichester (GB)

( * ) Notice: Subject to any disclaimer, the term of this patent is extended or adjusted under 35 U.S.C. 154(b) by 0 days.

(21) Appl. No.: 11/916,433

(22) PCT Filed: May 30, 2006

(86) PCT No.: PCT/GB2006/050132

§ 371 (c)(1),
(2), (4) Date: Dec. 3, 2007

(87) PCT Pub. No.: WO2006/131763

PCT Pub. Date: Dec. 14, 2006

(65) Prior Publication Data

US 2008/0213424 A1    Sep. 4, 2008

(30) Foreign Application Priority Data

Jun. 6, 2005    (GB) .................................. 0511370.9

(51) Int. Cl.
*B29C 45/56* (2006.01)
*B29C 45/64* (2006.01)

(52) U.S. Cl. ...................... 425/589; 425/590; 425/129.1
(58) Field of Classification Search ............... 425/129.1, 425/150, 589, 590, 595
See application file for complete search history.

(56) References Cited

U.S. PATENT DOCUMENTS

| 3,969,057 | A | 7/1976 | Pierre et al. |
| 6,248,281 | B1 | 6/2001 | Abe et al. |
| 6,440,351 | B1 * | 8/2002 | Saito et al. .................. 425/589 |

FOREIGN PATENT DOCUMENTS

| DE | 102004018114 | 12/2004 |
| EP | 0999023 | 5/2000 |
| JP | 60151015 | 8/1985 |
| JP | 7186226 | 7/1995 |

* cited by examiner

*Primary Examiner*—James Mackey
(74) *Attorney, Agent, or Firm*—Smith-Hill & Bedell, P.C.

(57) ABSTRACT

An injection compression moulding apparatus comprises two mould parts which define a mould cavity and are mounted on two relatively movable platens of an injection moulding press. An actuator is arranged in series with the platen action on at least one of the mould parts and is controlled in synchronism with the movement of the platens to enable the relative speed of the two mould parts during a mould closing phase of each article moulding cycle to be modified, the speed of relative movement of the mould parts being the vector sum of the speeds of movement and the platens and the actuator.

2 Claims, 4 Drawing Sheets

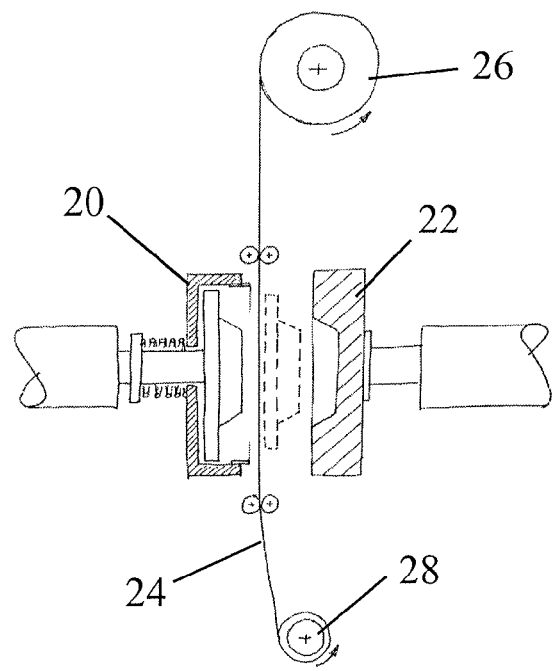
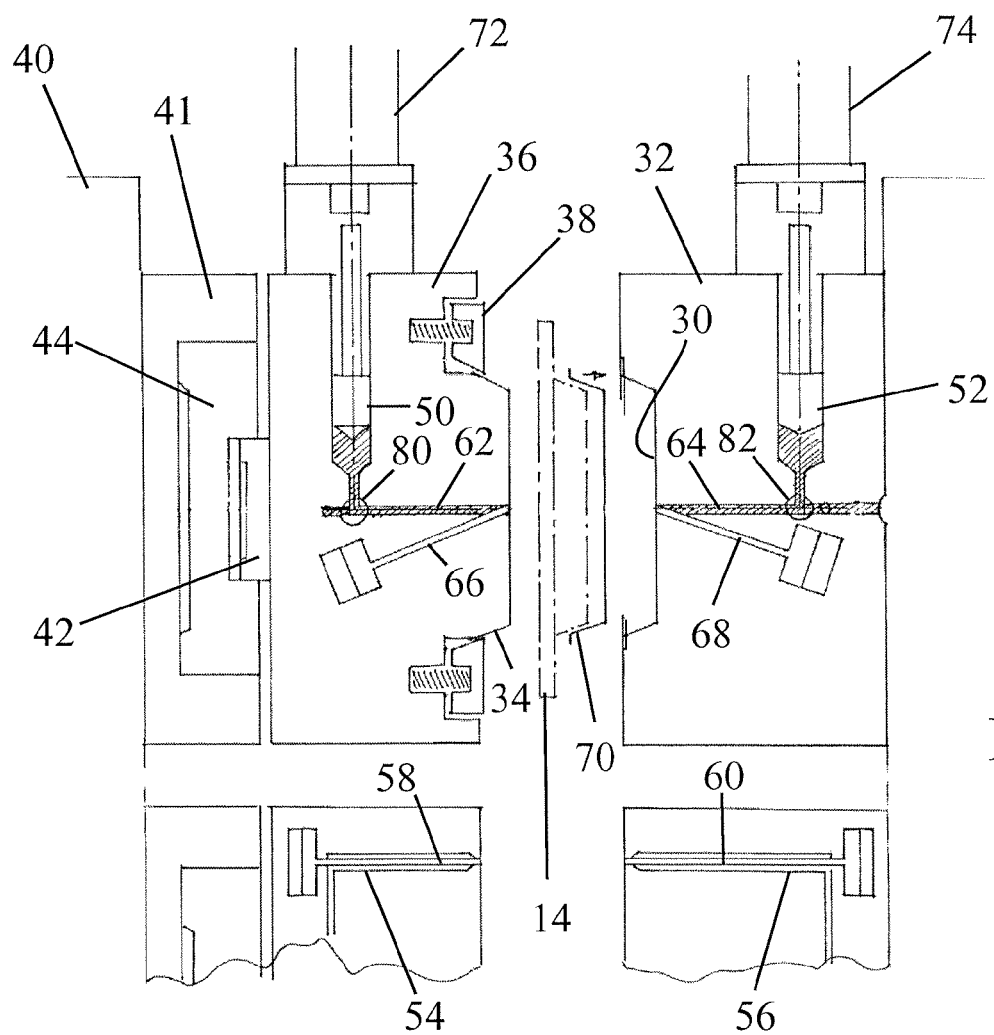

INJECTION COMPRESSION MOULDING APPARATUS

FIELD OF THE INVENTION

The present invention relates to apparatus for injection compression moulding of plastics material.

BACKGROUND OF THE INVENTION

It is known that large, thin articles are difficult to form by injection moulding. The reason is that the gap between the two parts of the mould is small and the distance that the material has to travel is too long for the pressure applicable by the moulding machine to be available at the far end of the gap from the injection point for driving the plastics to fill the mould. In short, the "flow path thickness ratio" is too long.

Conventionally, thin articles are formed by vacuum or pressure forming where a sheet of plastics material is stretched to conform to the shape of a mould. Such techniques are limited in their application as they cannot produce articles of even wall thickness or articles that have regions of increased or reduced wall thickness. This is because only one surface of the article is being moulded and the thickness at any point is determined exclusively by the thickness of the original sheet and the extent of its deformation.

This problem has been overcome by EP 1360057, which discloses injecting molten plastics material into an open mould forcing the plastics material to fill the mould by closing it at high pressure after injection. This method enables the use of cheaper materials which do not flow as well yet ensures that thin wall sections can be easily made.

It was known prior to EP 1360057 to move part of a mould in order to apply additional compression after having injected a plastics melt into a mould cavity in the conventional manner. This process, which was known as injection compression moulding (ICM) offered advantages of longer flow lengths, thinner walls and a lower level of material stresses. This made and still makes the process suitable for moulding such articles as CDs and DVDs (because of improved internal stresses) and vehicle body and instrument panels (because of improved impact resistance).

The known ICM processes differed from EP 1360057 in the extent of the compression of the plastics melt by the closing of the mould cavity. In the newer technology, the relative displacement of the mould parts is in excess of ten times the final mould thickness and may be as great as two hundred times the final moulding thickness. This was in contrast with known ICM processes, where a corresponding movement of typically twice the final wall thickness was used.

The present invention is concerned with an improvement of the apparatus described in EP 1360057.

According to the present invention, there is provided an injection compression moulding apparatus comprising two mould parts which define a mould cavity and are mounted on two relatively movable platens of an injection moulding press, wherein an actuator is arranged in series with the platen acting on at least one of the mould parts and is controlled in synchronism with the movement of the platens to enable the relative speed of the two mould parts during a mould closing phase of each article moulding cycle to be modified, the speed of relative movement of the mould parts being the vector sum of the speeds of movement and the platens and the actuator.

The present invention is based on the realisation that, during the final stage of closing the mould speed is a more important parameter than pressure in achieving moulded articles of uniform thickness and good surface finish. Though injection moulding presses are capable of applying and maintaining the desired high pressure once the mould has been closed, their speed of movement just before the mould is fully closed, is not necessarily optimum. For thinner sections, the speed may be too low and, for thicker sections, the speed may be too high and uncontrollable.

In the case of a press employing a toggle mechanism, the mechanical advantage of the lever system acting between the hydraulic cylinder and the platen augments the closing pressure but at the same time it slows down the rate of movement of the platen. Rather than attempt to modify the press, the present invention overcomes the problem by placing an actuator in series with at least one of the platens to supplement the relative movement of the platens of the press, the actuator being preferably built into the mould.

The actuator may be a fluid operated piston preferably a hydraulic piston.

In the impact moulding apparatus of EP 1360057 it is necessary to allow one of the mould parts to move towards the platen while injection of plastics material into the mould cavity is taking place. To accommodate both these features in a compact manner, the actuator of a preferred embodiment of the invention is constructed as an annular first piston receiving second piston that acts on said one mould part.

Conveniently, the two pistons are forced apart by means of a force sufficiently weak to allow said one mould part to move towards the associated platen when plastics material is injected into the mould cavity before the latter is fully closed.

BRIEF DESCRIPTION OF THE DRAWINGS

The invention will now be described further, by way of example, with reference to the accompanying drawings, in which:

FIG. 2 is a section through a punch and die used FIG. 1 to produce an oxygen impermeable blank, and FIGS. 3 to 7 are sections through the injection mould of FIG. 1 at different stages of a cycle in which a container is formed.

DETAILED DESCRIPTION OF THE PREFERRED EMBODIMENT

Figure 1:
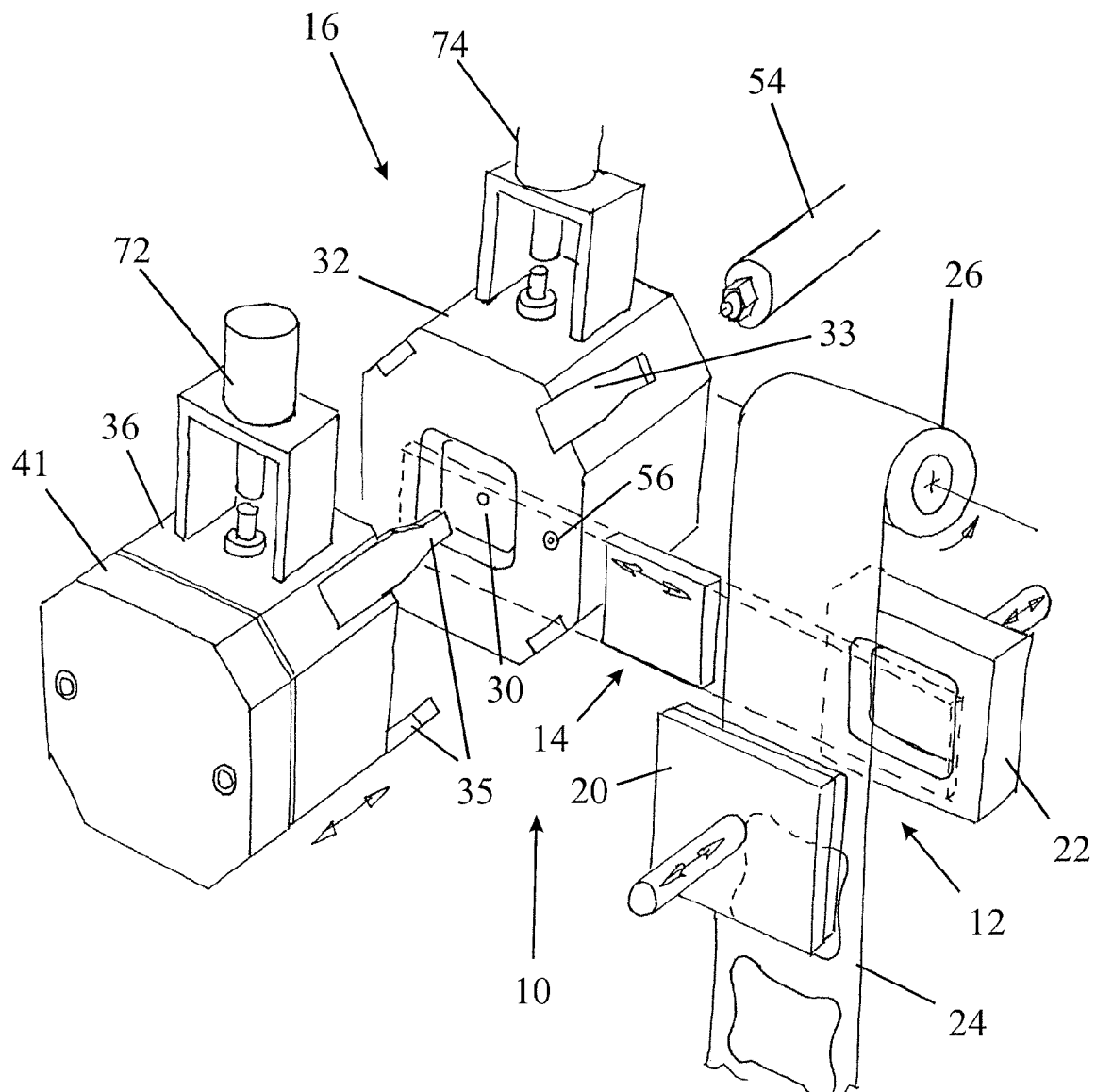
FIG. 1 is a schematic perspective view of an apparatus of the invention.

FIG. 1 shows schematically an apparatus 10 for forming a square container of the type commonly used, for example, in packaging margarine. Currently, such containers are often formed by thermoforming. In this process, a flat sheet is stretched by means of an applied vacuum and optional mechanical assistance to conform to a female mould. The process has disadvantages in that the base of the formed container is thicker than it needs to be, while the sides and the corner are weakened unnecessarily. In other words, the best use is not made of the plastics material. Furthermore, the plastics material does not contain an oxygen barrier and this reduces the shelf life of the packaged comestible product.

Conventional injection moulding can alternatively be used to form such an article but the length to thickness ratios are such that expensive material have to be used. Even when using low viscosity plastics materials, one is obliged to make the sides of the container thicker than necessary. If injection moulding is used, one may have to use more than one injection gate, especially if the container is rectangular. One has also to modify the thickness of different regions of the base so that the flow resistance favours the molten plastics material flowing towards the corners, thereby giving a bow tie effect. As with the thermoforming, the plastics material is not oxygen impermeable.

The containers produced by the above processes are oxygen permeable because the composition of the containers is homogeneous throughout their wall thickness. Because no oxygen impermeable plastics material is readily available that is safe to come into contact with food, one can only produce a food safe oxygen impermeable container if the walls are inhomogeneous, allowing the oxygen barrier to be formed by a layer that does not come into contact with the food.

The apparatus in FIG. 1 can be used to produce a container having three (or more) layers in its walls. As the thickness of the walls of the container is small, the thickness of the oxygen barrier must of necessity be even smaller. For this reason, aluminium is chosen as the oxygen barrier because even a sheet having a thickness measured in microns can act as an efficient oxygen barrier. A sheet of aluminium of this thickness cannot however be stretched and once a piece has been separated from a web, it is very flimsy and difficult to handle. The use of aluminium as a barrier thus poses several problems and these all are addressed in the design of the illustrated apparatus.

The apparatus 10 in FIG. 1 comprises a stamping mechanism 12, a transfer mechanism 14 and an injection-compression mould 16. The stamping mechanism 12 produces an aluminium foil blank of the same shape as the finished container. The transfer 14 mechanism transfers each blank after it has been formed from the stamping mechanism 12 to the cavity of the injection-compression mould 16 and there the blank is coated on both sides with a plastics material to form the finished container.

The stamping mechanism as shown in FIGS. 1 and 2, comprises a punch 20 and a die 22. The aluminium foil 24 is in the form of a continuous web extending between a supply roll 26 and a take-up roll 28. The movement of the punch 20 towards the die 22 will at first cut out piece of foil from the web and that piece is then deformed into a blank of the desired shape as it is crushed between the punch 20 and the die 22. Because the foil cannot be stretched, it creases in the corners in the same was as take-away aluminium containers, which are of course of much thicker material.

The foil 24 may be of aluminium or an aluminium alloy with a thickness of around 25 microns. As an alternative, the foil may 24 comprise aluminium which has already been coated with plastics films on both sides. In either case, it is important that the surface of the blank should be capable of bonding to the plastics material later to be injected around it and this may be assisted by passing the foil through a corona discharge or spraying the surface of the foil with a preparation that improves adhesion. It will be appreciated that if the foil comprises coated aluminium then the walls of the finished container will have five layers rather than just three.

The transfer mechanism 14 is not shown and will not be described in detail as its construction is not important to the present invention. It may for example comprise a robot arm designed to pick a blank out of the die 22 or off the punch 20 and transfer it to the mould cavity where it will be encapsulated in plastics material. Vacuum and compressed air can be used to pick up each blank from the stamping mechanism and to set it down in the mould cavity.

The injection-compression mould 16 operates on the same principle as that described in WO 02058909. In this case, however, plastics material is injected from both the core side and cavity side of the mould to cover both sides of the inserted blank. The injection-compression process can best be understood from reference to FIGS. 3 to 7.

FIG. 3 shows a mould cavity 30 formed in a stationary female mould part 32. A core 34 is carried by a core plate 36 and is surrounded around its rim by a spring biased conically tapering sealing ring 38, which operates in the manner taught in PCT/GB2004/005422. The core plate is moved towards and away from the female mould part 32 by a platen 40 of an injection moulding press. The platen 40 can form part of a conventional injection moulding machine, and it can for example be operated hydraulically, either directly or through a toggle mechanism. Specially shaped guide fingers 35, as taught by PCT/GB2004/005414, cooperate with correspondingly shaped slots 33 to align the mould parts with one another accurately even before the mould cavity is fully closed.

The platen 40 acts on the core plate 36 through an arrangement comprising a back plate 41 housing two series connected concentric pistons 42 and 44. The piston 42 is movable relative to the piston 44 and the latter is itself movable relative to the back plate 41 which is fixed to the platen 40. The purpose and method of operation of the pistons 42 and 44 will be described in more detail below.

Each of the core plate 36 and the female mould part 32 carries a respective dosing cylinder 50 and 52. The use of dosing cylinders is important in all cases where an article is formed by injecting a plastics material into a partially open mould, as injection back pressure cannot be relied upon to determine the full dose. In the present embodiment, two such dosing cylinders are needed because it is also important to set accurately the relative proportions of the plastics material lying on the opposite sides of the foil in the finished article. Valves 80 and 82 connected the dosing cylinders 50 and 52 either to the mould cavity or to an injection screw. The valve 82 of the dosing cylinder 52 of the female mould part 32 is always connected to an injection screw 54 (see FIG. 1) whereas the valve 80 of the dosing cylinder 50 of the core plate 36 is connected to an injection screw only when the mould is closed through communicating passages 54 and 56 which are opened and closed by valves 58 and 60. The dosing cylinder 50 of the core plate 36 may either be connected to the same injection screw 54 as the dosing cylinder 52 or to a second injection screw, depending on whether the same plastics material is to be used for both the inside and the outside of the container. Passages 62 and 64 controlled by gate valves 66 and 68 connect the valves 80 and 82 of the dosing cylinders 50 and 52 to the mould cavity.

A cycle commences with the parts of the mould in the position shown in FIG. 3. In this position the piston 44 is fully retracted into the back plate 41 and the piston 42 is fully extended to create a small gap between the core plate 36 and the back plate 41. The mould is fully open and the two dosing cylinders are charged with a dose of a plastics material. The two doses need not be equal but the combined dose corresponds to the volume to be injected into the mould cavity to form the finished container.

Figure 4:
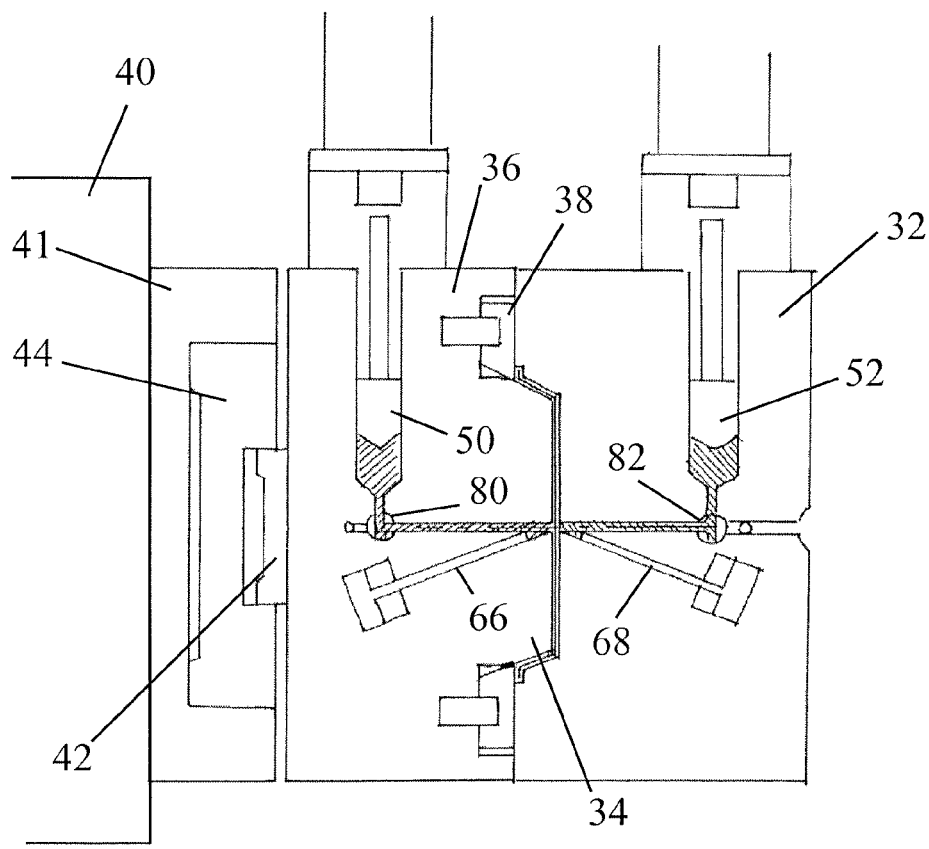

After the transfer mechanism 14 has positioned a blank 70 in the mould cavity 30, the back plate 41 is advanced by the platen 40 to the position shown in FIG. 4. While a gap still remains between the core plate 36 and the back plate 41, the core 34 is pushed into the mould cavity displacing trapped air from the cavity. The force acting to push the core 34 into the mould cavity is a weak air pressure acting between the pistons 42 and 44.

Figure 5:
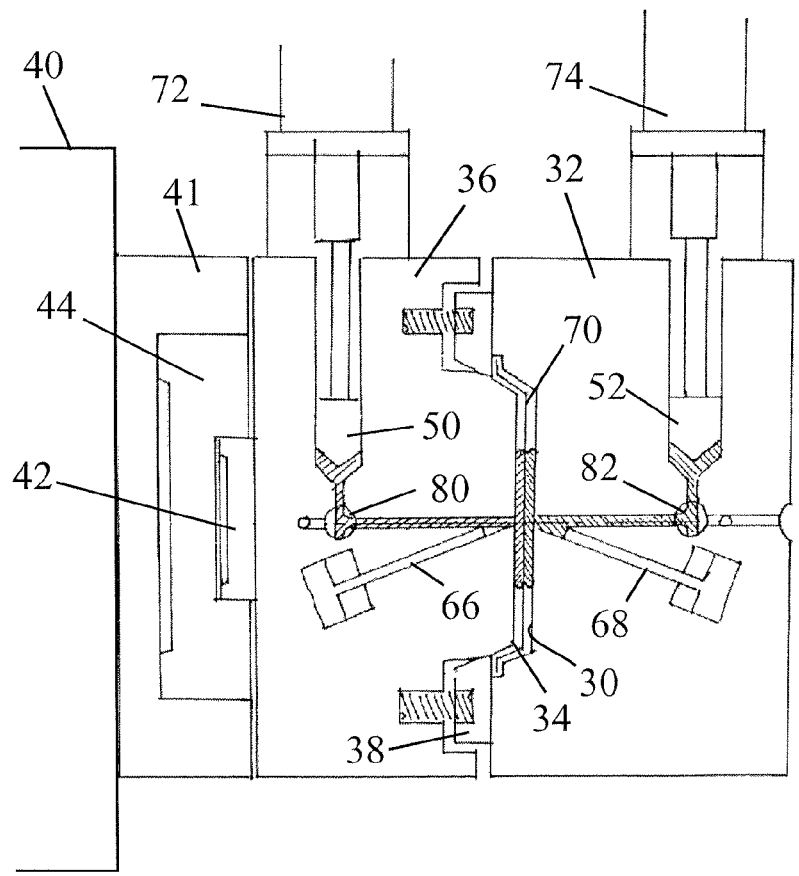

In the next stage of the cycle, shown in FIG. 5, the pistons of the two dosing cylinders 50 and 52 are operated by external actuators 72, 74 to pump the two stored doses of plastics material into the non-circular base of the mould cavity. It is important for the operation of the two actuators 72, 74 to be accurately synchronised and a simple manner in which this can be achieved is to use a single hydraulic cylinder to act on both of them as the mould approaches its fully close position thereby ensuring that the injection pressures on the opposite sides of the blank 70 are always matched to one another. At the same time, the valves 80 and 82 and the gate valves 66 and 68 are positioned to admit the molten plastics material into the mould cavity.

The injection pressure is sufficient to force the core plate 36 away from the female mould part, opposing the weak air pressure which acts on the piston 42 and closing the gap between the back plate 41 and the core plate 36. The ability of the core to move limits the pressure that can be reached by the plastics material in the base of the cavity so that it cannot travel up the sides of the cavity. Because of this, the injected plastics material first spreads to cover the entire base of the mould cavity and separates the mould parts only sufficiently for the predetermined dose of the plastics material to be accommodated within the perimeter of the base. Throughout this time, the sealing ring 38 remains in contact with the female mould part 32.

Figure 6:
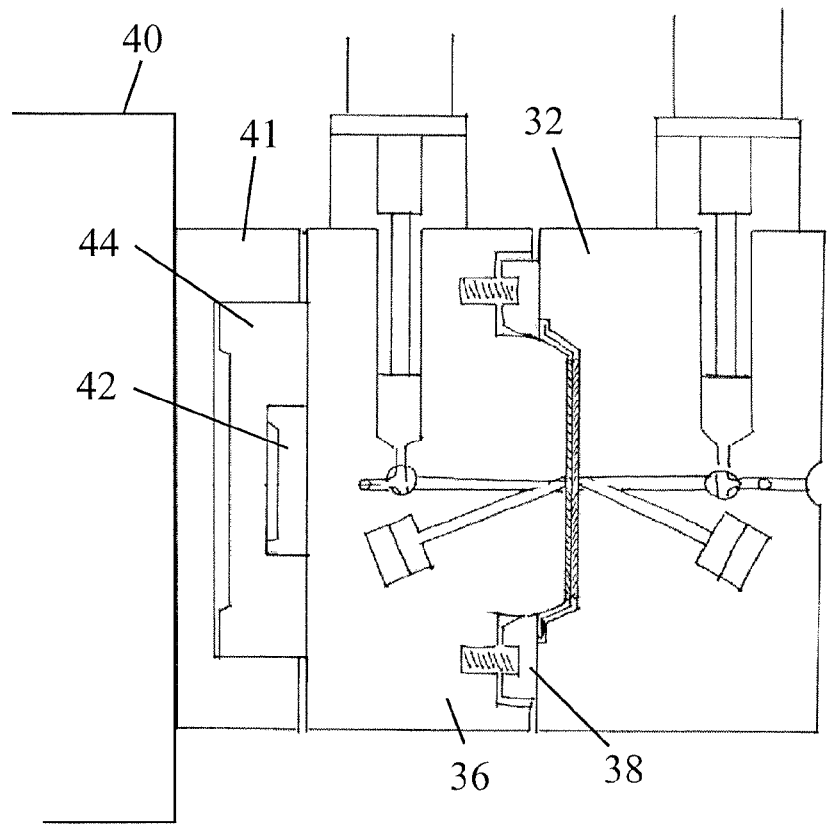
Figure 7:
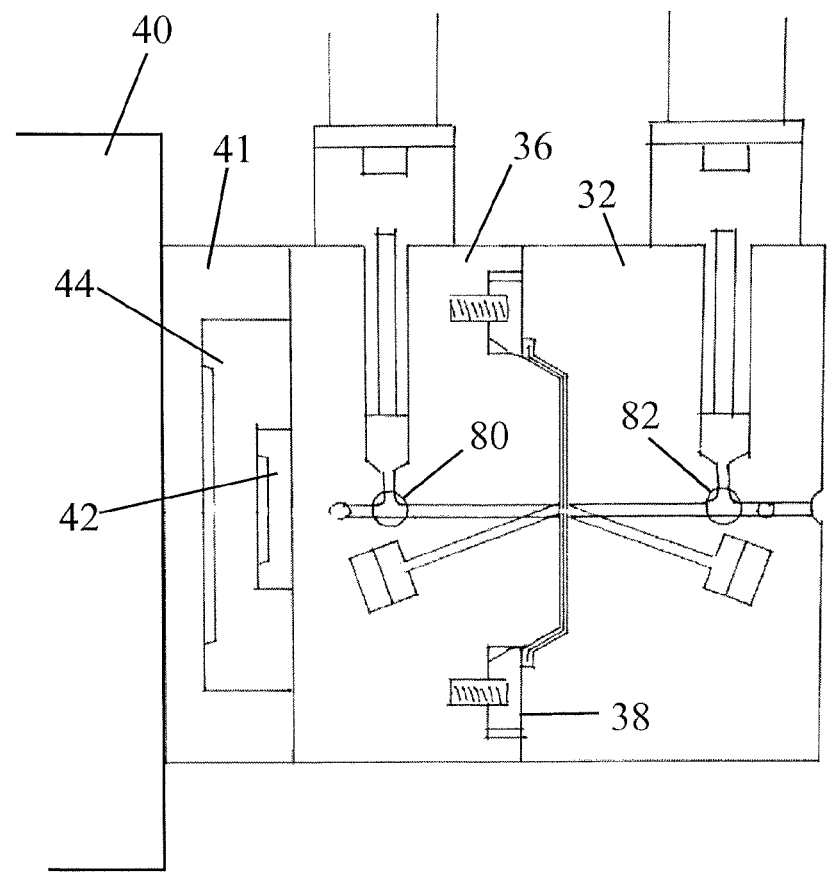

After completion of the injection step, the compression step is effected in the manner shown in FIGS. 6 and 7. Because the plastics material cools down as it travels up the sides of the mould cavity, compression needs to take place very rapidly and for this respect the speed of movement of the platen 40 may not be sufficient. To augment the speed with which the plastics material is compressed, the piston 44 is hydraulically operated to supplement the movement of the core 34 caused by advancing the platen 40.

As the plastics material flows to fill the cavity, the cavity is vented through a narrow gap between the sealing ring 38 and the core 34 but this gap does not allow the plastics material to enter into. Because of the way that the ring 38 seals against the core 34 when the mould is fully closed, it leaves only a minimal witness mark on the finished article.

In the final step shown in FIG. 7, the mould is fully closed by advancing the platen to its end position and the plastics material is maintained under compression as it cools in the cavity. The piston 44 is allowed to retract into the back plate 41 in readiness of the next operating cycle. While the mould is fully closed and the passages 58 and 60 are in register with each other, the gate valves 54 and 56 and valve 80 are opened to admit plastics material into the dosing cylinder 50 of the core plate 36. At the same time, a fresh does of plastics material is also directly supplied to the dosing cylinder 52 of the female mould part 32 past its valve 82. The stroke of the piston of each of the dosing cylinders 50 and 52 is adjustable to allow precise setting of the quantities of plastics material injected on each side of the aluminium blank.

This terminates the operating cycle and on returning to the position in FIG. 3 the formed article is ejected and a new blank is placed is in the mould cavity, as previously described.

The fact that the aluminium blank is creased need not mar the appearance of the finished article as the plastics materials may be opaque. On the contrary, the ability to use plastics materials of different colour on the inside and outside of the container may enhance its visual appeal.

It can thus be seen that the invention allows the moulding of an article that will improve the shelf life of comestible products by incorporating an effective hidden oxygen impermeable barrier layer.

The invention claimed is:

1. An injection compression moulding apparatus comprising two mould parts which define a mould cavity and are mounted on two relatively movable platens of an injection moulding press, wherein an actuator is arranged in series with the platen acting on at least one of the mould parts and is controlled in synchronism with the movement of the platens to enable the relative speed of the two mould parts during a mould closing phase of each article moulding cycle to be modified, the speed of relative movement of the mould parts being the vector sum of the speeds of movement of the platens and the actuator, the actuator being constructed as an annular hydraulic first piston receiving a second piston that acts on the associated mould part.

2. An apparatus as claimed in claim 1, comprising means for applying between the two pistons a force sufficiently weak to allow the associated mould part to move towards the platen when plastics material is injected into the mould cavity before the latter is fully closed.

* * * * *